INVENTOR.
Claude Hill,
BY Wolfe, Hubbard, Voit & Osann
Attorneys.

United States Patent Office 3,081,836
Patented Mar. 19, 1963

3,081,836
VEHICLE BRAKING CONTROL
Claude Hill, Kenilworth, England, assignor to Harry Ferguson Research Limited, Abbotswood, England, a British company
Filed May 25, 1960, Ser. No. 31,598
Claims priority, application Great Britain May 30, 1959
8 Claims. (Cl. 180—44)

This invention relates generally to automotive vehicle braking systems and concerns, more particularly, a braking control for preventing skidding and loss of braking force.

When the ground wheel brakes of a vehicle are applied with sufficient force to overcome the traction between the tires and the ground, the wheels tend to lock, that is become stationary relative to the vehicle. The tires thus skid on the ground and the vehicle operator experiences a loss of control over the vehicle. At the same time, the locking of a wheel means that the associated brake ceases to do any work and hence the effect of this brake toward reducing the speed of the vehicle is lost.

In a four-wheel drive vehicle, i.e., one having power supplied to a front pair of wheels and at least one pair of rear wheels, a form of braking control is obtained by transmitting power to the front and rear pairs of wheels through an intermediate controlled differential gear. A controlled differential gear is one which has its differential action limited so that, in the environment being discussed, the rotational speeds of the front and rear drive shafts can vary from one another only between fixed upper and lower limits. When these limits are reached, the differential is locked and the drive shafts are forced to rotate at speeds which vary by the limits imposed. A drive of this type is disclosed and claimed in U.S. Patent No. 2,796,941, issued June 25, 1957.

The effect of such a device on the braking action of the vehicle wheels will be appreciated by those skilled in the art. Should either one, or both, of the rear wheels lock, the rear wheel drive shaft tends to slow down or stop. As soon as the rotational speed of the rear drive shaft relative to the speed of the front drive shaft exceeds the lower limit imposed by the controlled differential gear, further differential action is prevented forcing the locked rear wheel or wheels to rotate at the predetermined speed differential relative to the front drive shaft. Of course, the same effect occurs if one, or both, of the front wheels tend to lock.

In drive systems of the above type, the controlled differential acts to prevent brake lockup by the factors tending to cause brake lockup, i.e. a brake actuating force greater than road and tire conditions permit, is not affected.

It is therefore, the basic aim of the invention to provide a novel braking control for avoiding skidding and loss of braking action by relieving braking forces excessive for the road conditions encountered.

More specifically, it is the primary object of the invention to provide a novel braking control for relieving braking forces which tend to cause lockup of a controlled differential gear of the above type. Since such a gear tends to lock up only when excessive braking force seeks to lock and thus skid one of the vehicle wheels, the braking control acts as an anti-skid unit.

It is also an object of the invention to provide a braking control system for use with a controlled differential gear that is exceptionally simple and economical to manufacture and which may be easily incorporated into a vehicle drive and braking system.

A related object is to provide a braking control of the above described character in which a single unit serves all wheels of the vehicle and which requires no additional gearing.

With more particularity, it is an object to provide a braking control as characterized above which is embodied, for the most part, in the vehicle transmission so as to be part of the sprung mass and easily protected against dirt and vibration.

Other objects and advantages of the invention will become apparent upon reading the following detailed description and upon reference to the drawings in which:

FIG. 3 is a fragmentary diagrammatic view similar to FIG. 1 showing an alternate modification.

While the invention will be described in connection with certain preferred embodiments, it will be understood that I do not intend to limit the invention to those embodiments. On the contrary, I intend to cover all alternatives, modifications, and equivalents as may be included within the spirit and scope of the invention as defined by the appended claims.

Figure 1:
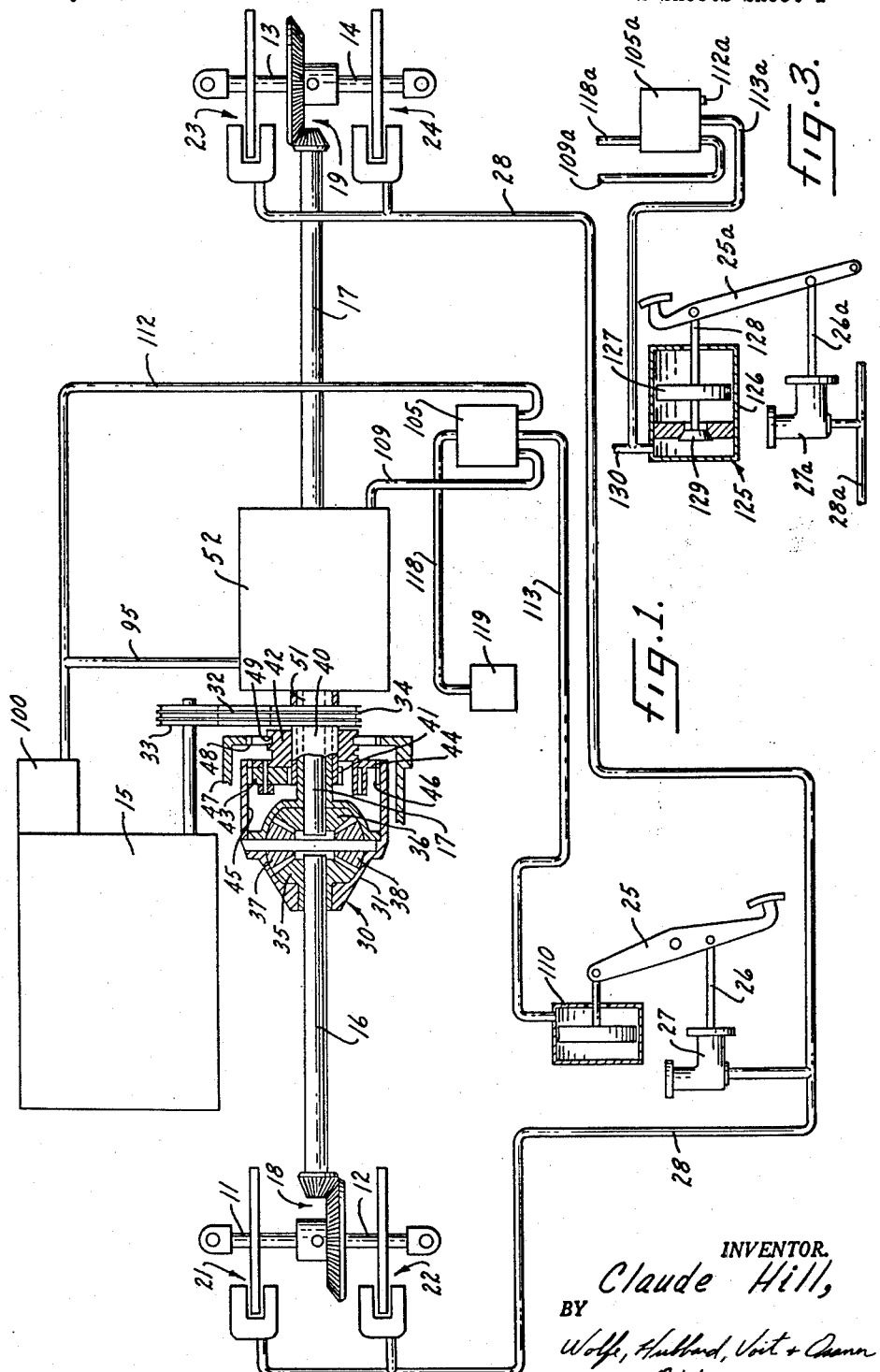
FIGURE 1 is a diagrammatic representation of a vehicle drive and braking system which embodies the invention.

Turning first to FIG. 1, there is shown a vehicle drive and braking system which embodies the present invention. The drive includes a pair of front axles 11 and 12 and a pair of rear axles 13 and 14, each of which is rotatably coupled in the usual manner to ground-engaging vehicle wheels, not shown. A power plant in the form of an internal combustion engine 15 is coupled through a front drive shaft 16 and a rear drive shaft 17 to each of the axles 11-14 so as to provide a four-wheel drive system. As is conventional, the front drive shaft 16 is connected to the front axles 11—12 through a differential gear 18 and the rear drive shaft 17 is coupled to the rear axles 13, 14 through a differential gear 19.

Each ground-engaging wheel is individually braked and in the illustrated construction, this is accomplished by providing each of the axles 11-14 with brakes 21, 22, 23 and 24, respectively. For actuating the individual wheel brakes 21-24, a manual braking system is provided including a brake pedal lever 25 coupled by a rod 26 to a master cylinder 27. Hydraulic lines 28 extend from the master cylinder 27 to each of the brakes 21-24 so that movement of the brake pedal lever 25 in a clockwise direction as seen in FIG. 1 causes actuation of each of the brakes.

In the preferred and illustrated embodiment, power is supplied from the engine 15 through a controlled differential gear 30 of the type disclosed and claimed in my application Serial No. 21,467 filed April 11, 1960. Thus, the input element of the differential, which in the present case is a carrier 31, is driven from the engine 15 through a chain 32 and sprockets 33 and 34. The output elements of the differential, that is sun gears 35 and 36, are keyed respectively to the drive shafts 16, 17. Planet gears 37 and 38 couple the input and output elements of the differential gear 30 in the usual manner.

For reversing the direction of rotation of the drive shafts 16, 17, the sprocket 34 is coupled to the differential gear carrier 31 through reversing gearing which, in the illustrated embodiment, is of the epicyclic type. To this end, the sprocket 34 is formed with a sleeve portion 40 which is journalled about the drive shaft 17 and which carries a sun gear portion 41. A carrier 42 is slidably and rotatably mounted on the sleeve portion 40 and carries a plurality of planet gears 43. The planet gear carrier 42 is also formed with a plurality of teeth 44.

The input element of the differential gear 30, that is the carrier 31, is formed with an annular portion 45 carrying a ring of internal gear teeth 46. The planetary gears 43 are in meshing engagement with both the gear teeth 46 and the sun gear 41 formed on the sprocket sleeve 40.

Spaced from the internal gear teeth 46 is a ring of internal dogteeth 48 formed on a portion of the transmission housing 47.

The gear carrier 42 is selectively positionable in any one of three positions. When the carrier occupies the position shown in FIG. 1, the teeth 44 on the carrier engage the teeth 46 on the annular portion 45 and thus a direct one-to-one drive is established between the sprocket 34 and the carrier 31 which serves as the input element of the differential gear 30. When the carrier 42 is shifted fully toward the right in FIG. 1, the gear teeth 44 mesh with the dogteeth 48 on the transmission housing 47 so as to lock the carrier against rotation. This establishes a reverse drive from the sprocket 34 through the planet gears 43 to the input of the differential gear 30. In its third intermediate position, the epicyclic gear carrier 42 is positioned with its gear teeth 44 disposed in the space between the internal gear teeth 46 and the dogteeth 48 so that the epicyclic gearing will not transmit power from the sprocket 34 to the differential gear 30 and hence the drive is in neutral.

For shifting the carrier 42, the carrier is provided with an annular groove 49 which is engaged by a conventional shifter fork, not shown. By operating the shifter fork in the usual manner, the epicyclic gearing can be shifted into neutral or reverse position from the direct drive position illustrated.

The action of the differential gear 30, whether in direct or reverse drive, is conventional. In normal operation when power is being supplied evenly to the drive shafts 16, 17, the drive shafts and the differential gear carrier 31 all rotate in unison without relative movement between any of the parts. However, should the drive shaft loading become uneven, then the relative speeds of the two drive shafts change, this being permitted by rotation of the differential carrier 31 relative to both of the drive shafts. Such differential action, that is one drive shaft rotating more rapidly or less rapidly than the other, is always accompanied by relative rotation between the drive shafts and the differential carrier 31, as is well known to those familiar with this art.

For controlling the differential action of the gear 30, the differential carrier 31 includes a sleeve 51 that is journalled about the drive shaft 17, and a dual one-way clutch assembly 52 is arranged to limit rotational speed variations between the shaft 17 and the sleeve 51. That is, the clutch assembly 52 permits the sleeve 51 to differ in rotational speed from the shaft 17 only within predetermined higher and lower limits. If these speed limits tend to be exceeded, the clutch assembly 52 locks the shaft 17 and the sleeve 51 together for rotation at the differential speed limits imposed. Thus, the differential action of the differential gear 30 is limited.

Figure 2:
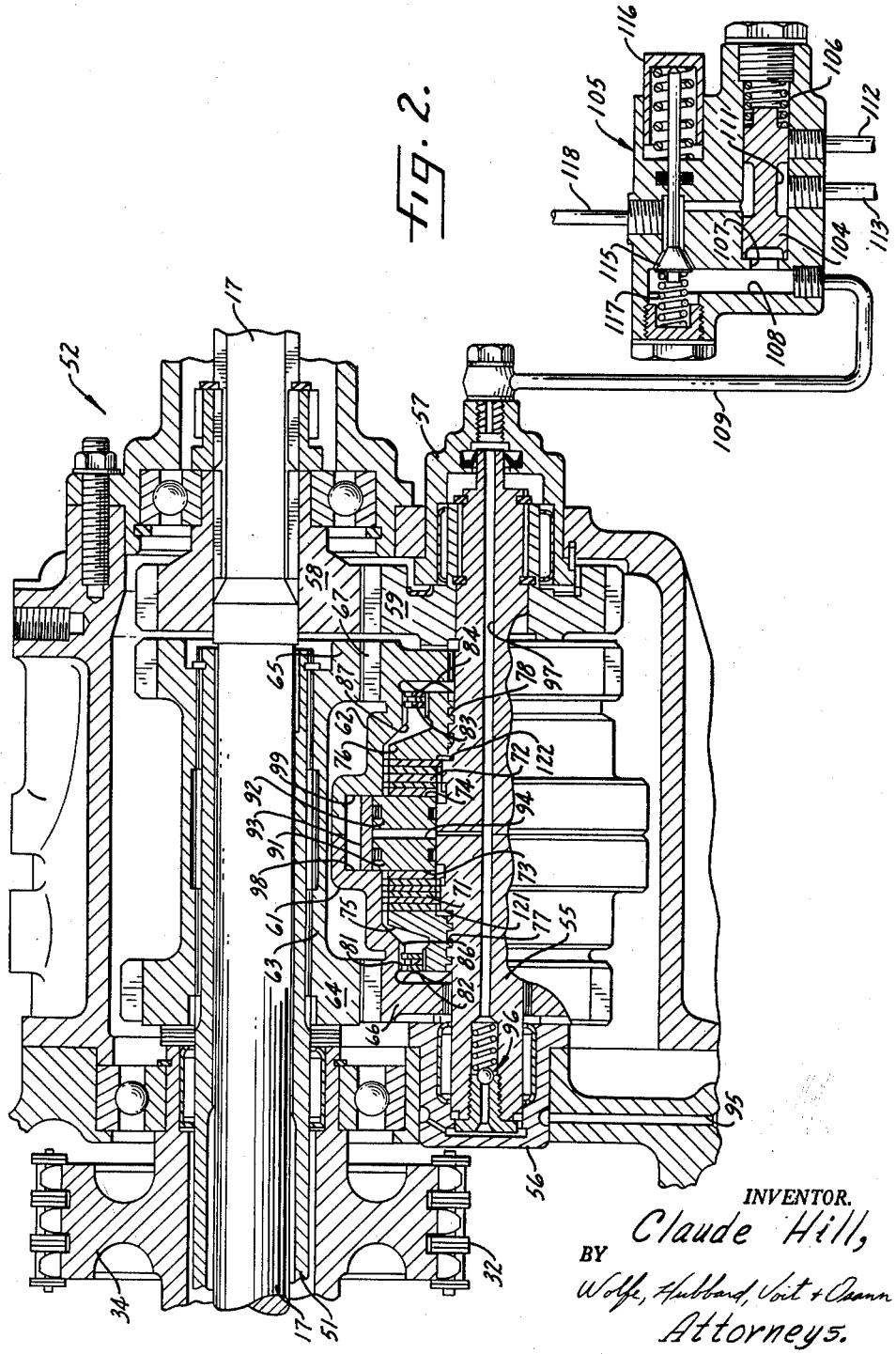
FIG. 2 is an enlarged fragmentary section of portions of the system shown in FIG. 1.

In the preferred construction, and turning particularly to FIG. 2, the sleeve 51 extends past the sprocket 34 to a point adjacent the dual one-way clutch assembly 52, and the clutch assembly includes a layshaft 55 journalled parallel to the shaft 17 and the sleeve 51. The opposite ends of the layshaft 55 are journalled in fluid-transmitting cups 56 and 57 mounted in apertures formed in the transmission housing. For setting up rotational speed limits, the drive shaft 17 is coupled to the layshaft 55 through gears 58 and 59, and the sleeve 51 is coupled to a pair of cup-shaped housing members 61 and 62 which are journalled on the layshaft in opposed adjacent relation. Preferably, the sleeve 51 carries a unitary base 63 formed with gears 64 and 65 which mesh with gears 66 and 67 formed on the housing members 61, 62 respectively.

The gear pairs 58 and 59, 64 and 66, and 65 and 67, all establish slightly different driving ratios so that the housing 61 rotates in the same direction as the layshaft 55 but at a slightly higher speed while the housing 62 rotates in the same direction as the layshaft 55 but at a slightly slower speed. The speed differences between the housing 61 and the layshaft, and the housing 62 and the layshaft, are the relative speed limitations imposed by the clutch assembly 52 on the drive shaft 17 and the sleeve 51. It will thus be apparent that these limitations can be varied by selecting appropriate driving ratios for the several gear pairs connecting the shaft 17 to the layshaft 55, and the sleeve 51 to the two housing members 61, 62.

To lock the shaft 17 and the sleeve 51 together as the shaft speed moves up or down to the predetermined limits, sets of annular friction plates 71 and 72 are disposed in the housings 61, 62 respectively. The several plates in each of the sets 71, 72 are alternately keyed to the surrounding housing and the layshaft 55 so that when they are pressed together, they frictionally clutch their respective housings to the layshaft. It will be seen that locking of either one of the housings 61, 62 to the layshaft 55 also results in locking the shaft 17 and the surrounding sleeve 51 together for rotation at the relative speeds imposed by the pairs of gears 64, 66 or 65, 67. This, of course, halts further differential action in the differential gear 30.

For operating the sets of friction plates 71, 72, the plates are sandwiched between abutment surfaces 73 and 74 and annular clutch-operating nut members 75 and 76. Movement of the annular clutch-operating nut members 75, 76 toward the adjacent sets of friction plates 71, 72 causes the plates to be pressed against the abutment surfaces 73, 74 so that the plates clutch together and lock the surrounding housings to the layshaft 55.

The clutch operating member 75 acts on the adjacent set of friction plates 71 only when the layshaft speed exceeds the speed of rotation of the housing 61, and the clutch operating member 76 acts on the adjacent set of friction plates 72 only when the layshaft speed becomes less than the speed of rotation of the housing 62. To accomplish this result, the members 75, 76 have nut portions threadably engaging helical threads formed on the layshaft at 77, 78 respectively, and a frictional drag is imposed between each nut member 75, 76 and its surrounding housing. In the illustrated construction, the frictional drag referred to is provided by a plurality of friction discs 81 which are alternately keyed to the nut member 75 and the surrounding housing 61 and which are urged into frictional engagement by a spring 82. A similar plurality of friction discs 83, urged together by a spring 84, are alternately keyed to the nut member 76 and the surrounding housing 62. The frictional action of the drag discs 81, 83 tends to cause the nut members 75, 76 to rotate in unison with their respective housings 61, 62. Because the housings 61, 62 rotate at speeds which differ from the speed of the layshaft 55, the nut portions 75, 76 tend to rotate relative to the helical threads formed on the layshaft at 77, 78.

In the illustrated construction, helical threads formed on the layshaft 55 are of the same hand so that rotation of the nut member 75, as it is dragged by the housing 61 at a rotational speed that is higher than the rotational speed of the layshaft 55, tends to run the nut member 75 away from the set of friction plates 71 and toward the left in FIG. 2. Conversely, rotation of the nut member 76, as it is dragged by the housing 62 at a speed slightly less than the speed of rotation of the layshaft 55, tends to run the nut member 76 toward the right in FIG. 2 and away from the set of friction plates 72. Abutments 86 and 87 on the housings 61 and 62 respectively, limit the threadable movement of the nut members 75, 76 away from the adjacent sets of plates 71, 72.

When the speed of the layshaft 55 increases so that it rotates more rapidly than the housing member 61, the drag plates 81 tend to relatively retard the nut member 75 so that its threadable engagement at 77 with the layshaft runs the nut member toward the right in FIG. 2, squeezing the set of friction plates 71 against the abutment surface 73 and clutching the layshaft 55 to the housing member. Thus, the speed of the shaft 17 can only increase relative to the rotational speed of the surrounding sleeve 51 to the point where the layshaft 55 is rotated at the same speed as the housing 61. Any further speed differential causes the nut 75 to be run toward the right in this figure with the result that the layshaft and the housing 61 are locked together and the drive shaft 17 is rotatably coupled to the sleeve 51 through pairs of gears 64, 66 and 58, 59.

Similarly, when the rotational speed of the layshaft 55 drops below the rotational speed of the housing 62, the drag imposed by the plates 83 on the nut member 76 tends to rotate the nut member at a speed higher than the speed of the layshaft with the result that the nut member is run toward the left in FIG. 2 thereby squeezing the set of friction plates 72 and clutching the layshaft to the housing 62. As observed above, this locks the drive shaft 17 to the sleeve 51 and ceases the differential action in the differential gear 30. In this way, the speed of the drive shaft 17 cannot decrease relative to the rotational speed of the sleeve 51 beyond the point where the rotational speed of the layshaft 55 becomes less than the speed of the housing 62. When this limit is reached, the friction discs 72 are effective to lock the drive shaft 17 and the sleeve 51 together through the pairs of gears 65, 67 and 58, 59.

It will be appreciated, of course, that operation of the dual one-way clutch assembly 52 depends on the abutment surfaces 73, 74 resisting the clutch actuating forces developed in the clutch by the nut members 75, 76 being run against their associated sets of friction plates.

The limits within which the differential action of the gear 30 is held is sufficient to permit the vehicle being driven to turn as sharply as its steering gear permits and to accommodate slight wheel diameter variations that might be caused by differences in tire inflation or uneven loading of the vehicle. In other words, sufficient differential action is permitted in the differential gear 30 to accommodate all normal reasons why the drive shaft 16 powering the front wheels of the vehicle should rotate more or less rapidly than the drive shaft 17 powering the rear wheels of the vehicle.

When an abnormal condition is encountered, such as locking up of a wheel brake when the associated wheel loses traction on ice or in mud, it will be understood that the drive shafts 16, 17 tend to operate at much different speeds. However, because of the control exerted on the differential gear 30 by the clutch assembly 52, the differential action is ended at the predetermined limits.

In keeping with the invention, the abutment surfaces 73, 74 against which the friction plates 71, 72 are urged are defined by a pair of movable members in the form of annular pistons 91 and 92 whose positions are controlled by fluid pressure. In the illustrated embodiment, the pistons 91, 92 are positioned between the layshaft 55 and a surrounding cylinder member 93 so as to define an annular chamber 94 lying between the two pistons. Fluid is conducted from a conduit 95 to the chamber 94 through a one-way valve 96 and a passage 97 formed in the layshaft 55. In the illustrated embodiment, hydraulic fluid is supplied under pressure to the conduit 95 from a pump 100 driven by the engine 15 (see FIG. 1).

It can thus be seen that the pressure of the fluid in the chamber 94 tends to urge the pistons 91, 92 apart until their abutment surfaces are stopped against ledge portions 98 and 99 formed on the housing members 61 and 62 respectively. The abutment of the pistons 91, 92 against the respective ledge portions 98, 99 establishes the operating positions for the two pistons and the hydraulic fluid pressure in the chamber 94 urges the pistons into their operating positions with a predetermined force that is dependent upon the fluid pressure developed by the pump 100. During actuation of either set of clutching friction plates 71, 72, the clutch actuating force of the associated nut member tends to urge one of the pistons 91, 92 against the hydraulic pressure in the chamber 94, and this pressure builds up to resist the clutch actuating movement of the nut members 75, 76. Hence, the greater the force tending to exceed the differential action limits imposed on the gear 30, the greater the hydraulic pressure developed in the chamber 94 between the two pistons 91, 92.

While the construction and operation of the dual one-way clutch assembly 52 should be clear from the above discussion, for a more complete review of the features and advantages of this particular clutch, reference is made to the previously referred to copending application Serial No. 21,467.

In accordance with the present invention, the hydraulic system holding the movable pistons 91, 92 in position to permit operation of the clutch assembly 52 is coupled to the brake actuating system so as to partially disable the brake actuating system when excessive braking forces tend to cause the controlled differential to lock up. In this way, braking forces tending to lock up a wheel brake are relieved without allowing the wheel to completely lose traction and skid and thereofre an anti-skid control is imposed on the braking system.

In the illustrated embodiment, the pressure of the hydraulic fluid in the chamber 94 is sensed by an operator 104 that is movably mounted in a valve assembly 105. The operator 104 takes the form of a plunger biased by a compressed spring 106 against a stop 107. The operator 104 is exposed at one end to a chamber 108 in the valve assembly 105 and the chamber 108 communicates with the chamber 94 through a line 109 and the passage 97 in the layshaft 55. It can thus be seen that the development of fluid pressure in the chamber 94 creates substantially the same fluid pressure in the chamber 108 and when this pressure, acting on the operator 104, exceeds the force of the spring 106, the operator will be urged toward the right in FIG. 2.

For partially disabling the braking system, a hydraulic servo motor 110 is coupled to the brake pedal lever 25 so that actuation of the motor resists movement of the pedal in a direction to apply the wheel brakes 21–24. The operator 104 controls actuation of the motor 110 by being provided with a relieved portion 111 that, when the operator 104 is shifted to the right in FIG. 2, connects a line 112 leading from the pump 100 to a line 113 which connects to the input side of the servo motor 110.

It can therefore be seen that a buildup of fluid pressure in the chamber 94 of the dual one-way clutch assembly 52 exerts a force on the operator 104, and when this force exceeds the pressure of the spring 106 the operator is shifted to the right in FIG. 2 so as to connect the servo motor 110 with the hydraulic pump 100. This actuates the motor 110 and partially disables the braking system since the motor exerts a force on the brake pedal lever 25 in opposition to the manual force required to operate the wheel brakes 21–24.

The operating effect of the braking control which has been described will now be readily apparent. Should the vehicle operator apply manual pressure to the pedal lever 25 that is sufficiently great to cause one of the wheels to lock up and skid, the differential action of the differential gear 30 immediately tends to be exceeded with the result that the clutch assembly 52 locks up, forcing the skidding wheel to rotate. At the same instant, operation of the clutch assembly 52 causes a buildup of the hydraulic pressure in the chamber 94 with the result that the operator 104 is urged against its spring bias to actuate the servo motor 110. This partially disables the braking system by relieving the heavy braking pressure which originally caused the skidding tendency. The motor 110 remains effective to partially disable the braking system until the tendency of the wheels to skid is relieved and the clutch assembly 52 resumes its non-actuated condition.

For disabling the clutch assembly 52, as is necessary when the carrier 42 is shifted into reverse drive position, the valve assembly 105 is also provided with a pressure relief valve 115 operated by a button 116. The valve 115 is normally held in closed position by a compressed spring 117 but when the button 116 is depressed, that is moved to the left in FIG. 2, the valve 115 opens and permits fluid to be exhausted from the chamber 108 through a line 118 leading to a sump 119. This, of course, relieves the fluid pressure in the chamber 94 so that when the nut members 75, 76 move against the adjacent sets of friction plates 71, 72, the plates simply slide freely and no braking or locking action is created. To prevent the members 75, 76 from simply following the retreating pistons 91, 92, stop ledges 121 and 122 are formed on the layshaft 55 so as to limit the threadable movement of the nut members 75, 76. Since it is desirable to disable the clutch assembly 52 when the transmission is shifted into reverse drive, the button 116 is preferably positioned so that it will be engaged and depressed by the shifter fork assembly provided for shifting the carrier 42 of the epicyclic gearing when the shifter fork is moved into reverse drive position.

As an alternative brake actuating system with which the invention can be utilized, a power assisted arrangement of the type shown in FIG. 3 can be employed. In this embodiment, parts similar to those previously described have been given the same identifying numeral with the distinguishing suffix "a" added.

To provide a power assist for the FIG. 3 brake actuating system, a pneumatic motor 125 including a cylinder 126 and a piston 127 is provided with the piston being coupled by a rod 128 to a brake pedal lever 25a. The rod 128 also carries a valve element 129 which, when unseated, opens the cylinder 126 through a line 130 to the exhaust manifold, not shown, of the engine 15. Thus, when the brake pedal lever 25a is manually moved in a counterclockwise direction, the first increment of movement urges the rod 128 to the left in FIG. 3 so as to unseat the valve element 129. A negative pressure is therefore created at the left of the piston 127 within the cylinder 126 so that atmospheric pressure urges the piston to the left thereby developing a force tending to assist the manual movement of the brake pedal lever 25a. The brake pedal lever is coupled through a rod 26a to a master cylinder 27a that supplies fluid under pressure to the individual wheel brakes of the vehicle.

For partially disabling the power assisted brake actuating system shown in FIG. 3 in accordance with the invention, a valve assembly 105a is provided having an internal construction identical to the valve assembly 105 previously described. That is, the development of a high fluid pressure transmitted through a line 109a causes a valve operator to shift so that lines 112a and 113a are brought into communication. In this embodiment, the line 113a is open to the vacuum or negative pressure line 130 and the line 112a opens to the atmosphere. Thus, when sufficient pressure is developed through the line 109a, the side of the cylinder 126 at the left of the piston 127 is opened to the atmosphere through the lines 113a and 112a so as to destroy the power-boosting effect of the motor 125. In this way, a pressure buildup through the line 109a caused by operation of a differential gear control clutch similar to the clutch assembly 52, partially disables the brake actuating system by destroying the power boost effect exerted on the brake pedal lever 25a.

Those skilled in the art will appreciate that the braking control systems described above, when incorporated with a controlled differential gear of the type shown, are exceptionally simple and require few additional parts and little structural modification of the drive system. A single unit serves all of the individual brakes of the vehicle and requires no additional gearing. Furthermore, the braking control structure can be embodied, for the most part, in the vehicle transmission itself so that it becomes part of the sprung mass and may be easily protected against dirt and vibration.

I claim as my invention:

1. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a one-way clutch for positively limiting rotational speed variations between said parts by clutching said parts together at a predetermined rotational speed variation, said clutch including a movable member positioned to resist the clutch actuating force developed in said clutch and thus permit operation of said clutch, positioning means for urging said member into said position with a predetermined force, a brake system for applying said ground wheel brakes, and means coupled to said positioning means for partially disabling said brake system when said predetermined force is exceeded.

2. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a one-way clutch for positively limiting rotational speed variations between said parts by clutching said parts together at a predetermined rotational speed variation, said clutch including a hydraulic piston positioned to resist the clutch actuating force developed in said clutch and thus permit operation of said clutch, a supply of fluid under pressure for urging said piston into said position with a predetermined force, a brake system for applying said ground wheel brakes, and a biased operator coupled to said supply of fluid for partially disabling said brake system when said fluid pressure is increased upon resisting said clutch actuating force.

3. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a one-way clutch for positively limiting rotational speed variations between said parts by clutching said parts together at a predetermined rotational speed variation, said clutch including a movable member positioned to resist the clutch actuating force developed in said clutch and thus permit operation of said clutch, positioning means for urging said member into said position with a predetermined force, a brake system for applying said ground wheel brakes, a fluid motor coupled to said brake system for resisting application of said brakes, and means coupled to said positioning means for actuating said fluid motor when said predetermined force is exceeded.

4. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a one-way clutch for positively limiting rotational speed variations between said parts by clutching said parts together at a predetermined rotational speed variation, said clutch including a movable member positioned to resist the clutch actuating force developed in said clutch and thus permit operation of said clutch, positioning means for urging said member into said position with a predetermined force, a brake system including a power boosting servo motor for applying said ground wheel brakes, and means coupled to said positioning means for disabling said servo motor when said predetermined force is exceeded.

5. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a journalled shaft carrying a housing member journalled thereon, a set of annular friction plates adjacent said housing member and being alternately keyed to the shaft and housing member, an annular piston slidably disposed on said shaft adjacent said housing member and defining an abutment surface adjacent said friction plates, a nut member disposed adjacent said set of plates so as to sandwich them between said abutment surface and said nut member, means for establishing a frictional drag between said housing member and the nut member so that rotation of the housing member tends to rotate the nut member, one of said rotatably mounted parts being drivingly coupled to said shaft, the other of said rotatably mounted parts being drivingly coupled to said housing member so as to rotate the member at a speed level different from the speed of the shaft, means defining a helical threaded interengagement between said shaft and the nut member tending to urge the nut member away from the adjacent friction plates when the rotational speed of said shaft is on one side of said speed level, means for supplying fluid under pressure behind said piston so as to urge it and the adjacent plates into the travel path of the nut member, a brake system for applying said ground wheel brakes, and means coupled to said fluid supply for partially disabling said brake system when said fluid pressure exceeds a predetermined limit.

6. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a journalled shaft carrying a housing member journalled thereon, a set of annular friction plates adjacent said housing member and being alternately keyed to the shaft and housing member, an annular piston slidably disposed on said shaft adjacent said housing member and defining an abutment surface adjacent said friction plates, a nut member disposed adjacent said set of plates so as to sandwich them between said abutment surface and said nut member, means for establishing a frictional drag between said housing member and the nut member so that rotation of the housing member tends to rotate the nut member, one of said rotatably mounted parts being drivingly coupled to said shaft, the other of said rotatably mounted parts being drivingly coupled to said housing member so as to rotate the member at a speed level different from the speed of the shaft, means defining a helical threaded interengagement between said shaft and the nut member tending to urge the nut member away from the adjacent friction plates when the rotational speed of said shaft is on one side of said speed level, means for supplying fluid under pressure behind said piston so as to urge it and the adjacent plates into the travel path of the nut member, a brake system for applying said ground wheel brakes, a fluid motor coupled to said brake system for resisting application of said brakes, and means coupling said fluid motor to said fluid supply for actuating said motor when said fluid pressure exceeds a predetermined limit.

7. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a journalled shaft carrying a housing member journalled thereon, a set of annular friction plates adjacent said housing member and being alternately keyed to the shaft and housing member, an annular piston slidably disposed on said shaft adjacent said housing member and defining an abutment surface adjacent said friction plates, a nut member disposed adjacent said set of plates so as to sandwich them between said abutment surface and said nut member, means for establishing a frictional drag between said housing member and the nut member so that rotation of the housing member tends to rotate the nut member, one of said rotatably mounted parts being drivingly coupled to said shaft, the other of said rotatably mounted parts being drivingly coupled to said housing member so as to rotate the member at a speed level different from the speed of the shaft, means defining a helical threaded interengagement between said shaft and the nut member tending to urge the nut member away from the adjacent friction plates when the rotational speed of said shaft is on one side of said speed level, means for supplying fluid under pressure behind said piston so as to urge it and the adjacent plates into the travel path of the nut member, a brake system including a power boosting servo motor for applying said ground wheel brakes, and means coupled to said fluid supply for disabling said servo motor when said fluid pressure exceeds a predetermined limit.

8. In a vehicle having a power plant and two ground wheel drive shafts coupled to different ground wheels with individual brakes, the combination comprising, a differential gear for supplying power from said power plant to said drive shafts, a pair of rotatably mounted parts coupled respectively to said shafts through means including said differential gear so that differential action in said gear causes relative rotation between said parts, a journalled shaft carrying a housing member journalled thereon, a set of annular friction plates adjacent said housing member and being alternately keyed to the shaft and housing member, an annular piston slidably disposed on said shaft adjacent said housing member and defining an abutment surface adjacent said friction plates, a nut member disposed adjacent said set of plates so as to sandwich them between said abutment surface and said nut member, means for establishing a frictional drag between said housing member and the nut member so that rotation of the housing member tends to rotate the nut member, one of said rotatably mounted parts being drivingly coupled to said shaft, the other of said rotatably mounted parts being drivingly coupled to said housing member so as to rotate the member at a speed level different than the speed of the shaft, means defining a helical threaded interengagement between said shaft and the nut member tending to urge the nut member away from the adjacent friction plates when the rotational speed of said shaft is on one side of said speed level, means for supplying fluid under pressure behind said piston so as to urge it and the adjacent plates into the travel path of the nut member, a brake system for applying said ground wheel brakes, a biased operator opening into said supply of fluid, and means connected to said operator for partially disabling said brake system when said fluid pressure exceeds the biasing force on said operator so as to move the latter.

References Cited in the file of this patent

UNITED STATES PATENTS

| | | |
|---|---|---|
| 2,012,737 | Baughman | Aug. 27, 1935 |
| 2,136,574 | Campbell | Nov. 15, 1938 |
| 2,796,941 | Hill | June 25, 1957 |
| 2,821,267 | Olving | Jan. 28, 1958 |
| 2,851,115 | Buckendale | Sept. 9, 1958 |
| 2,949,740 | Aikman | Aug. 23, 1960 |
| 2,959,012 | Johnson | Nov. 8, 1960 |